Figure 1:
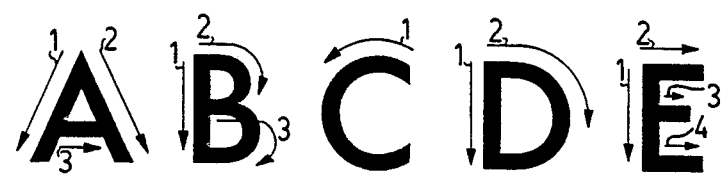
Figure 1:
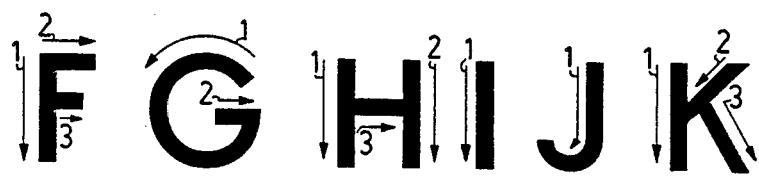
Figure 1:
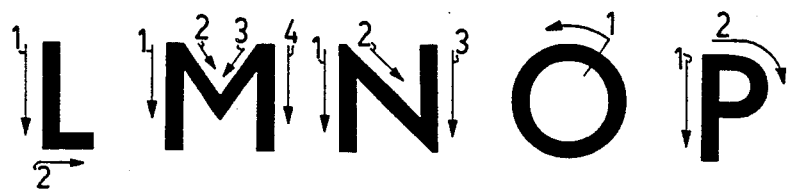
Figure 1:
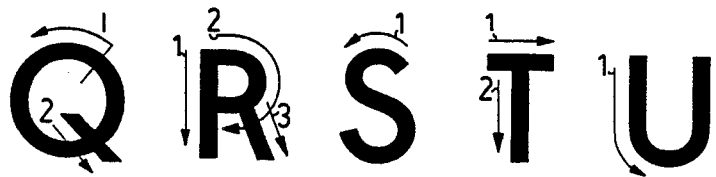
Figure 1:
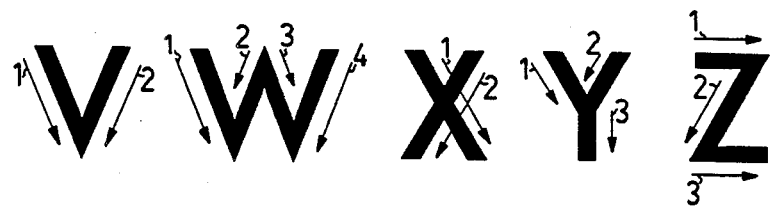

United States Patent [19]

Maddocks

[11] Patent Number: 4,685,885

[45] Date of Patent: Aug. 11, 1987

[54] INSTRUCTIONAL PRINTING EQUIPMENT

[76] Inventor: John W. Maddocks, R.R. No. 2, Thorndale, Ontario, Canada

[21] Appl. No.: 768,277

[22] Filed: Aug. 22, 1985

[51] Int. Cl.⁴ ............................................. G09B 11/04
[52] U.S. Cl. .................................................... 434/164
[58] Field of Search ................................. 434/164, 163

[56] References Cited

U.S. PATENT DOCUMENTS

| | | | |
|---|---|---|---|
| 3,197,892 | 8/1965 | Hancy | 434/164 |
| 3,731,402 | 5/1973 | Paul | 434/164 |
| 3,774,319 | 11/1973 | Sprowls | 434/164 |
| 3,869,813 | 3/1975 | Hancy | 434/163 |

FOREIGN PATENT DOCUMENTS

| | | | |
|---|---|---|---|
| 101845 | 8/1937 | Australia | 434/164 |
| 670476 | 9/1963 | Canada | 434/164 |

*Primary Examiner*—William H. Grieb
*Attorney, Agent, or Firm*—Robert F. Delbridge; Arne I. Fors

[57] ABSTRACT

Instructional printing equipment for teaching the correct manner of printing letters and/or numerals includes a set of letters and/or numerals each formed as a block with at least one groove forming the configuration of a letter or numeral concerned. Each groove has a surface shaped to facilitate movement of a writing instrument along the groove in a preferred direction to be used when writing the letter or numeral concerned and to resist the movement of the writing instrument therealong in an opposite direction.

1 Claim, 4 Drawing Figures

FIG. 2.

FIG. 3.
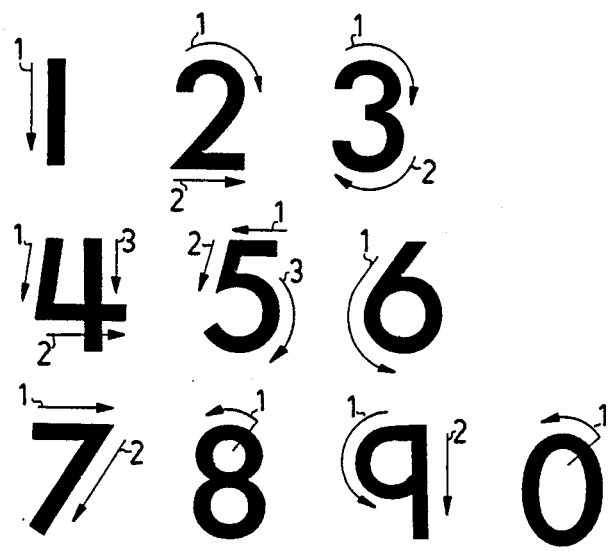
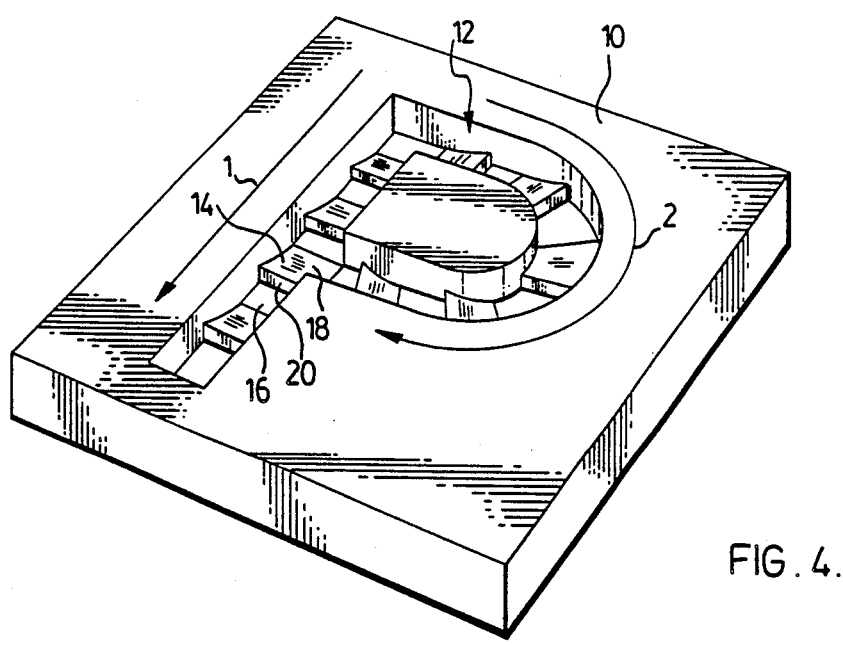
FIG. 4.

INSTRUCTIONAL PRINTING EQUIPMENT

This invention relates to instructional printing equipment for teaching learners, especially children, to form letters and/or numerals in a prescribed manner.

Although it is well known to use stencils for this purpose, such existing equipment does not cause the user to print letters and/or numerals in the manner regarded as correct in the educational field.

According to the present invention, instructional printing equipment for teaching the correct manner of printing letters and/or numerals comprises a set of letters and/or numerals each formed as a block with at least one groove forming the configuration of a letter or numeral concerned, each groove having a surface to facilitate movement of a writing instrument along the groove in a preferred direction to be used when writing a letter or numeral concerned and to resist movement to the writing instrument therealong in an opposite direction.

Preferably, the surface of each groove is an upper surface. The upper surface may have a series of apertures spaced therealong to enable a writing instrument moved over the surface to pass through each aperture and consequently make a mark on a writing surface positioned beneath the letter or numeral concerned. The upper surface may comprise a series of surface portions inclined upwardly in the preferred direction, each upwardly inclined surface portion being followed by a steeply downward inclined portion to resist movement of the writing instrument in the opposite direction.

Instructional printing equipment in accordance with the invention assist learners to print, to form letters, to enhance the size, shape and readability of the letters and to have those letters formed in the direction or progression, that is from left to right. Similar comments apply to numerals. The act of using the printing equipment involves tactile/kinaesthetic memory in connection with visual memory to re-enforce the correct method and lead to sound practice in the teaching of printing. To those knowledgeable in the field of teaching children, left to right progression is critical also in the area of reading.

Instructional printing equipment in accordance with the invention is intended to aid teachers and also parents to teach and/or allow children to learn to print in the recognized fashion with a minimum of instruction and one-to-one involvement. These learners need not be restricted to able children but may include disabled learners, precocious learners, those from other cultural or language backgrounds and adults.

There is no reason to believe that children will intuitively know that our written English language is written and read in a direction moving from left to right and multi-wording messages from the upper left of the page to the lower right of the page. Similarly, those whose written symbols are not those of the English language need to learn the direction or progression of this language so as to learn not only the language but the correct direction and formation of the letter, words, numerals, and script.

As soon as the young learner takes an interest in the messages embodied in the printed symbol, the parents seize the opportunity to teach the recognition or the representation of the children's name, and normally instruct the child using various media to have the child reproduce the symbols. There may exist the concern that the letters are formed correctly and if not the burden of correction will rest with the teacher.

Instructional printing equipment in accordance with the invention therefore serves several functions. The printing equipment shows the widely accepted shape, relative size and formation of the letters and/or the numerals, and requires that these be formed in the most acceptable direction. The printing equipment allows for a parent or teacher to permit independent experimentation and practice without immediate supervision. The printing equipment requires student involvement and attention in that it does not simply perform the task for them. The printing equipment engages and employs the tactile/kinaesthetic memory along with visual memory to re-enforce the correct performance.

The invention therefore provides instructional equipment which will encourage and ultimately teach children and learners of various abilities, background and cultures, the accepted method of printing letters. The invention also enables learners to practice the correct formation and to repeat the formation after practice, without using the printing equipment. Also, the printing equipment may be employed by teachers and parents with minimal supervision and, after minimal instruction, to effect adequate and correct training in the formation of the letters.

Instructional printing equipment in accordance with the invention can be manufactured by forming, molding, engraving or casting in flexible or rigid material, such as plastic, textiles or rubber. The printing equipment may be transparent, translucent or opaque, colored or colorless.

Embodiments of the invention will now be described, by way of example, with reference to the accompanying drawings, in which:

FIG. 1 is a diagramatic view of the alphabet showing the desired number of strokes and their direction for forming each upper case letter, FIG. 2 is a similar view for each lower case letter, FIG. 3 is a similar view for numerals 1 to 9 and 0, and FIG. 4 is a perspective view of the upper case letter P of instructional printing equipment in accordance with a preferred embodiment of the invention.

Referring to the drawings, FIG. 1 is a diagramatic view of the upper case or capital letters of the Roman alphabet indicating the preferred number of strokes and their direction to be used in the formation of each letter. For example, the upper case letter P should be formed by a first downwardly stroke 1 to provide the vertical part of the P, and a second stroke 2 which starts from the top in a left to right direction, curves downwardly and then moves in a right to left direction to meet the vertical part about halfway down its length. FIG. 2 is a similar diagramatic view for lower case or small letters and FIG. 3 is a similar view for arabic numerals 1 to 9 and 0.

FIG. 4 shows an upper case letter P constructed in accordance with a preferred embodiment of the invention, which is in the form of a directional stencil. A rectangular block 10 of suitable molded synthetic plastic material has a groove 12 in the shape of the letter P. The bottom of the groove 12 has a series of spaced portions 14 with apertures 16 therebetween. Each spaced bottom portion 14 has an upper surface 18 which slopes upwardly in the direction in which it is intended that a writing instrument should travel when forming the letter. Each upwardly inclined upper surface 18 is followed by a steeply downwardly inclined surface 20 which resists movement of the writing instrument in the opposite direction.

The nature of the construction of the other letters and numerals in accordance with a preferred embodiment will be readily understood from the above description of the construction of the letter P.

In use, and again using the upper case letter P as an example, the user can make the first stroke 1 with a writing instrument, for example a pencil or pen, moving the writing instrument downwardly for the length of the stroke 1. The writing instrument will alternately mark a writing surface under the letter when the writing instrument reaches an aperture 16 and then ride up an inclined surface 18 of a bottom portion 14 to the next aperture 16. After completing the first stroke 1, the second stroke 2 is commenced from the same position as the first stroke 1, the second 2 being completed by moving the writing instrument around the loop of the P. Thus, the letter P can only be properly formed by moving the writing instrument in the desired direction, since movement in the opposite direction is resisted by the steepwardly inclined surface portions 20.

The blocks 10 of instructional letters and/or numerals may be separate blocks for each letter and/or numeral or may be formed as integral blocks containing a number of letters and/or numerals. For examples, a single integral block may contain upper case letters, with a further block containing lower case letters, and a still further block containing numerals. The invention may also of course be used to teach the formation of symbols such as punctuation marks.

Other embodiments of the invention will be readily apparent to a person skilled in the art, the scope of the invention being defined in the appended claims.

What I claim as new and desire to protect by Letters of the United States is:

1. Instructional printing equipment for teaching the correct manner of printing letters and/or numerals comprising a set of letters and/or numerals each formed as a block with at least one groove forming the configuration of a letter or numeral concerned, each groove having an upper surface shaped to facilitate movement of a writing instrument along the groove in a preferred direction to be used when writing the letter or numeral concerned and to resist the movement of the writing instrument therealong in an opposite direction, said upper surface comprising a series of surface portions inclined upwardly in said preferred direction, each upwardly inclined surface portion being followed by a steeply downwardly inclined portion to resist movement of a writing instrument in said opposite direction, and each upwardly inclined portion being spaced from a preceding steeply downwardly inclined portion to provide an aperture to enable a writing instrument moved over the upper surface to pass through each aperture and consequently make a mark on a writing surface positioned beneath the letter or numeral concerned.

* * * * *